CLIFFORD M. PETERS
NORMAN F. BROWN
ROBERT W. DINNING
INVENTORS

July 24, 1962 C. M. PETERS ET AL 3,045,750
CONTROL SYSTEMS
Filed Jan. 22, 1957 11 Sheets-Sheet 5

CLIFFORD M. PETERS
NORMAN F. BROWN
ROBERT W. DINNING
INVENTORS

ATTORNEYS

July 24, 1962

C. M. PETERS ET AL 3,045,750

CONTROL SYSTEMS

Filed Jan. 22, 1957

CLIFFORD M. PETERS
NORMAN F. BROWN
ROBERT W. DINNING
INVENTOR

BY *Browning Simmons & Hyer*

ATTORNEYS

July 24, 1962 C. M. PETERS ET AL 3,045,750
CONTROL SYSTEMS
Filed Jan. 22, 1957 11 Sheets-Sheet 8

CLIFFORD M. PETERS
NORMAN F. BROWN
ROBERT W. DINNING
INVENTORS

BY
ATTORNEYS

CLIFFORD M. PETERS
NORMAN F. BROWN
ROBERT W. DINNING
INVENTORS

CLIFFORD M. PETERS
NORMAN F. BROWN
ROBERT W. DINNING
INVENTORS

BY
ATTORNEYS

CLIFFORD M. PETERS
NORMAN F. BROWN
ROBERT W. DINNING
INVENTORS

ATTORNEYS

United States Patent Office 3,045,750
Patented July 24, 1962

3,045,750
CONTROL SYSTEMS
Clifford M. Peters, Robert W. Dinning, and Norman F. Brown, Longview, Tex., assignors to U.S. Industries, Inc., New York, N.Y., a corporation of Delaware
Filed Jan. 22, 1957, Ser. No. 635,345
14 Claims. (Cl. 166—52)

This invention relates to control systems and more particularly to automation systems for controlling flow from a plurality of sources into a common conduit and for sampling the production of the individual sources and is an improvement on the inventions disclosed in our application Serial No. 537,970, filed October 3, 1955, now U.S. Patent 2,940,477.

The systems of this invention and the individual components of the systems can be used in a variety of industrial applications where it is desired to automatically obtain physical samples and other information such as volume of flow from one or more sources in sequential order and/or where it is desired to program production from one or more sources for various periods of flow and no flow.

The system of this invention has for its primary purpose the automation of control of production from wells where fluid from a group of wells is handled as a unit, as for example an oil producing lease. The specification therefore describes the invention with reference to its specific application in the control of fluids from one or more wells to automatically control the periods of productivity of the wells together with automatic taking of samples of oil from each well and measuring the volume of gas and oil produced by each well. However, it is contemplated that the invention has application to control of flow of other fluids from other sources.

State authorities generally limit the volume of oil which may be produced from each producing well. Production is usually established on a monthly basis. It is customary to produce a given well during each month for the period necessary to obtain the well's quota and then shut-in the well during the remainder of the month.

In the past it has been customary to manually control flowing time of each well in a field and to manually obtain samples of the oil produced. Where a company owns a large number of wells in a single field it has been customary to station personnel at the field to be in constant attendance on the wells to control their flow and to obtain the necessary samples and flow data.

It would be advantageous to be able to both program production and obtain the necessary test samples and data automatically. In some areas electric power is not available or is preferably not used for programming. In these instances it would be advantageous to have a system for programming and testing which is fluid operated and clock controlled in its entirety. In order that the system be completely automatic, the programming and testing portions of the system should be co-ordinated. There has not heretofore been available such a system or many of the components thereof. While the system of this invention may be entirely fluid controlled, it is contemplated that some portions of the system could be powered or controlled electrically.

In our copending application we disclosed a system for automatically sampling the product of a plurality of wells. This invention provides an improved system wherein a purge period occurs before each test sample is taken.

By this invention there is provided a system for automatically programming flow from a plurality of sources such as wells, and for obtaining a true test sample of the production from each source. The programming and testing systems may be used separately or together as desired.

It is an object of this invention to provide an automation system for programming flow from a plurality of sources which employs fluid pressure mechanisms in the controls and a clock.

Another object is to provide in combination with the programming system of the preceding object a test system which operates in conjunction with the programming system and is also suitable for control by fluid pressure and a clock.

Another object is to provide a means for programming production of a plurality of sources and a test system for sequentially obtaining samples or metering of the product from each source in which the test system interrupts the programming means to direct flow of fluid from a source through the test system for a predetermined period of time.

Another object is to provide a system for taking test samples sequentially of the products from a plurality of sources in which the test portion of the system is purged before each test sample is taken.

Another object is to provide a system to sequentially take test samples from a plurality of sources in which a time operated controller sequentially places each source on test, purges the test portion of the system, and then takes a test sample.

Another object is to provide a system for obtaining test samples from a plurality of sources in which the samples are collected in separate containers and in which a time operated controller sequentially places each source on test while preventing effective operation of the sampler to permit the test system to be purged of fluid from the previous test, moves a fresh container into sample receiving position, and after the purge cycle is complete permits operation of the sampler to obtain a sample.

Another object is to provide a system as in the preceding object in which the system is provided with a fluid operated recorder which indicates which source is on test cycle and the period during which the source was on purge and on test.

Another object is to provide a test system for sequentially obtaining test samples from a plurality of sources in which a single time controller pressurizes and vents a control piping system for each source to purge the system and then take a sample.

Another object is to provide a test system for sequentially obtaining test samples from a plurality of sources in which a time controller sequentially pressurizes two inlets into a control piping system for each source to pressurize the piping system and purge the test system and while pressurizing the second inlet vents the first inlet to cause a sample to be taken.

Another object is to provide a clock controlled programmer for selectively controlling periods of flow and shut-in of a plurality of sources such as oil wells.

Another object is to provide a programmer for a plurality of sources in which a low power clock controls a high power drive to a hard to turn timing mechanism of the programmer.

Another object is to provide a programmer for a plurality of sources such as oil wells in which means are provided for manually bypassing the programmer and placing the wells individually on production.

Another object is to provide a programmer as in the preceding object in which the controlled sources such as oil wells are provided with pneumatically operated motor valves which are pressurized through the programmer to place the wells on production in which the manual bypass means establishes direct fluid communication between the source of control fluid pressure and the motor operator for a valve.

Another object is to provide a low pressure operated control means for a sampling device for obtaining fluid samples from a line which sampling device is operated by line pressure.

Another object is to provide a sampling device as in the preceding object in which samples are separately received in a plurality of containers and in which the control means places a fresh container in sample receiving position prior to each time the sampling device is placed in operation.

Another object is to provide a fluid operated chart recorder having a plurality of pens.

Other objects, features and advantages of this invention will be apparent from the drawings, specification and claims.

In the drawings wherein there is shown an illustrative embodiment of this invention and wherein like reference numerals indicate like parts:

FIG. 7 is a view on an enlarged scale of the control valve and bypass valves shown in FIG. 4;

Figure 1:
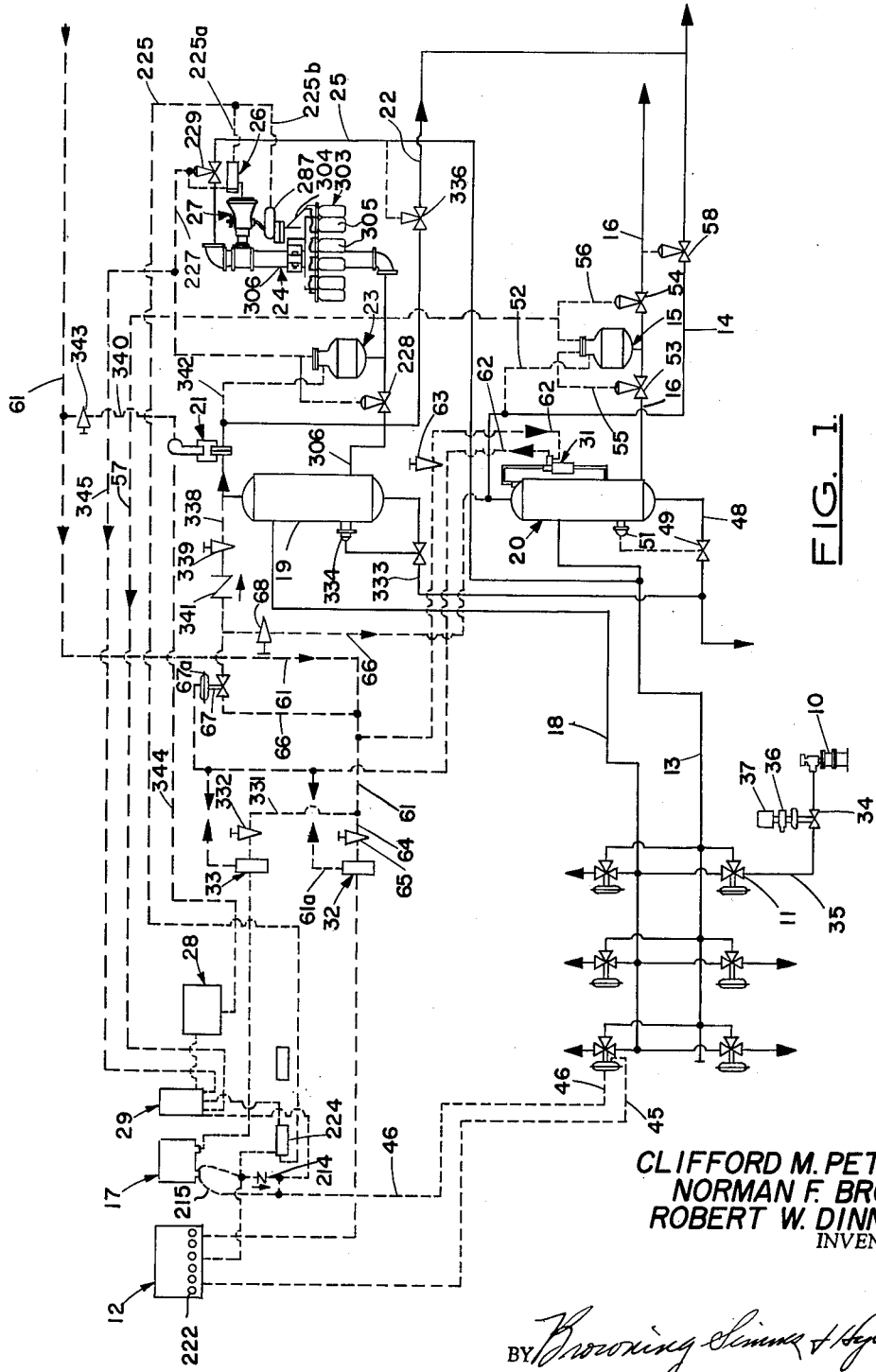
FIG. 1 is a schematic diagram of a flow system embodying this invention in which flow conduits are shown by solid lines and control pressure conduits are shown by dashed lines.

The test and control system illustrated in FIG. 1 is designed to control a plurality of wells from a single field. Preferably, the control is entirely pneumatic. One of these wells is schematically illustrated at 10 in the drawings. Flow from each well is first taken through one of the center position closed two-way, three-way motor valves indicated generally at 11. A valve 11 is provided for each well. By operation of these motor valves, each well may be flowed or shut-in as desired and production may be directed to a production manifold line or to a test manifold line.

A programmer for automatically controlling the periods of product and shut-in of each well is shown schematically at 12. This programmer sends a pneumatic signal to each of the three-way valves 11 and shifts them between closed position and a position in which the well is placed on production. Fluid from the wells is conducted through production manifold line 13 to a separator of any desired conventional form indicated generally at 20 in which water, oil and gas are separated. Gas from the separator passes through gas outlet line 14 to gas consumption. Oil from the separator passes through a volume meter indicated generally at 15 and thence through line 16 to a central tank battery not shown.

It is desired to periodically run tests of each individual well and for this purpose an automatic time operated controller indicated generally at 17 operates a selected one of the three-way control valves 11 to shift the selected valve to test and direct fluid from the particular well to be tested to the test manifold line 18. If the well is being programmed to production, as will usually be the case, the controller interrupts the programmer and diverts flow to the test system. Preferably, operation is by a pneumatic signal. Fluid to be tested is first directed into a separator of any desired conventional form illustrated schematically at 19 for separating gas, oil and water.

Gas from separator 19 flows through an orifice meter indicated generally at 21 for determining the volume of gas produced by the particular well and thence through line 22 to gas consumption.

Oil from the separator 19 passes through a volume meter indicated generally at 23 where it is measured, and a sampler indicated generally at 24 where a sample is taken. Sampler 24 preferably comprises sample taking unit 27, sample diverting unit 287, and a sample receiving unit 303. Oil from sampler 24 passes through line 25 to production manifold line 13 upstream of separator 20.

The controller 17 operates the sampler 24 to direct the test sample to a fresh container as a well is placed on test. The controller also operates the shut-in pilot valve indicated generally at 26 at this time to prevent operation of the sampler. This permits the well to flow on test and purge the test system. After a predetermined length of time the controller 17 opens the shut-in pilot valve 26 permitting operation of the sample taker 27 of the sampler, which proceeds to take a sample of fluid from the test line and introduce it into one of the sample receiving containers of the sampler.

A signal is fed from the volume meter 21 to an integrator indicated schematically at 28. With every thousand cubic feet of gas flow the integrator 28 feeds a signal to chart recorder indicated generally at 29. Signals are also fed to this chart recorder from the test oil meter 23 and from the production volume meter 15 each time each volume meter dumps. The controller 17 also sends signals to the chart recorder 29 to indicate the identity of the particular well placed on test, the length of time the well is on test, and the time of the purge.

Both the programmer 12 and the controller 17 are operated from a source of pilot supply gas. The liquid level control 31 for separator 20, which may be of any conventional form will shut-in the wells of the system with abnormally high liquid level in the separator. The high-low liquid level control operates to shut off the supply of pneumatic fluid to the programmer through control valve 32 and to controller 17 through control valve 33 which is identical to valve 32 and vents the motors for valves 11.

Referring now to the components of the system in detail, fluid from a typical well as at 10 passes through valve 34 to line 35. Valve 34 is a normally closed type motor valve. The motor valve 34 is controlled by a low pressure shut-in control of conventional form indicated schematically at 36. Valve 34 is also controlled by a back pressure regulator indicated generally at 37 to prevent excessively high pressures from reaching the system.

Figure 2:
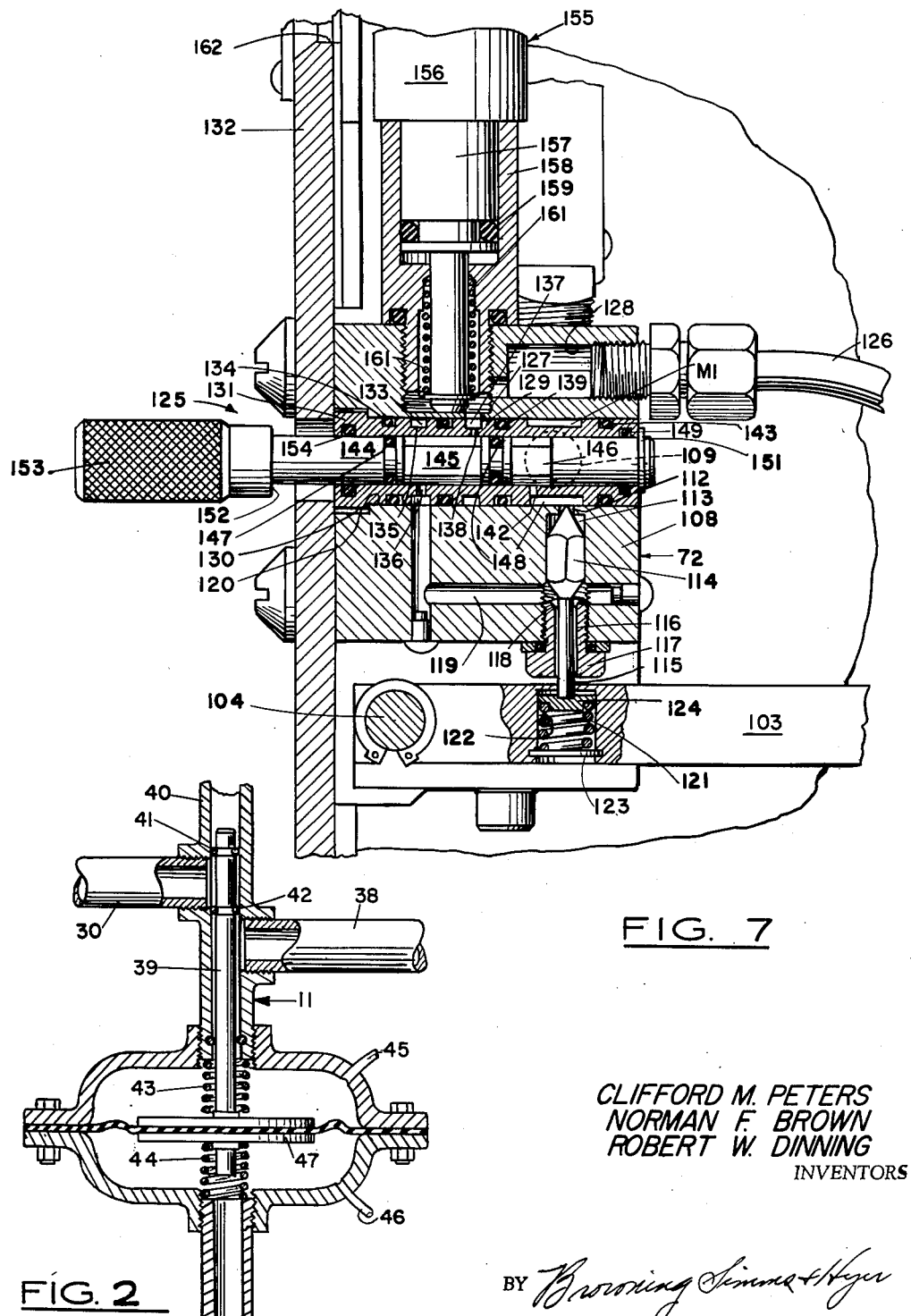
FIG. 2 is a schematic illustration of a motor valve for controlling flow from a well.
Figure 3:
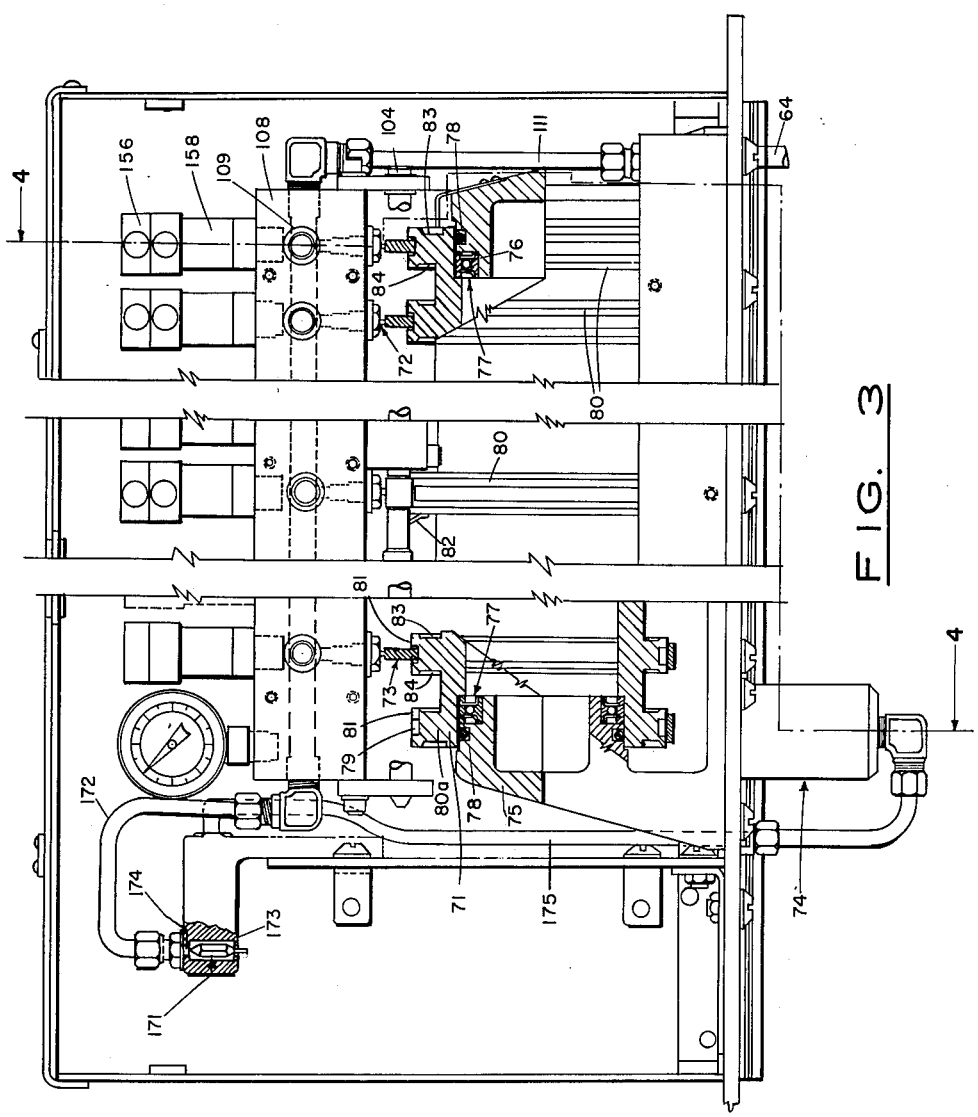
FIG. 3 is a front elevational view of a programmer, with the front of the case removed, and with portions shown in vertical cross section illustrating this invention, with duplicating sections of the programmer omitted for purposes of clarity.

Fluid from line 35 is introduced into the inlet 30 of the three-way motor valve indicated schematically at 11 (FIG. 2). It will be understood that the valve 11 is a schematic illustration only of a three-way motor valve and a center position closed three-way motor valve such as the valve shown in FIG. 4 of the copending application of Clifford M. Peters and Robert W. Dinning, Serial No. 591,077, filed June 13, 1956, now U.S. Patent 2,897,836, may be utilized. The valve 11 is provided with a production outlet 40 and a test outlet 38. A valve member 39 shifts between the central position, as shown, to shut-in the well and a position in which the valve member is withdrawn to position seal 41 between inlet 30 and test outlet 38 and direct flow through production outlet 40, and a position in which seal 42 is on the production outlet side of inlet 30 to direct flow through test outlet 38.

The motor for the valve is of the diaphragm type and when the pressure above and below the diaphragm 47 is equal, the centering springs 43 and 44 will center the valve and shut-in the well. Thus, it will be appreciated that increasing pressure on the underside of the diaphragm through conduit 45 will open the valve to production and increasing pressure on the top of the diaphragm through conduit 46 will open the valve to test.

Considering first the wells which are on production, flow is in the conventional manner through the separator 20 to oil outlet line 16, gas outlet line 14 and water outlet line 48. A valve 49 controlling the water outlet line from the separator is operated in the conventional manner by an interface float mechanism 51.

The volume meter 15 is of conventional form and is operated by gas pressure from branch line 52 which conducts gas pressure from line 14 to the volume meter 15. The volume meter operates upstream oil control valve 53 and downstream oil control valve 54. In the conventional manner the volume meter closes downstream valve 54 and opens upstream valve 53 until the volume meter is full. The volume meter then closes upstream valve 53 and opens downstream valve 54 to dump the contents of the volume meter. Valves 53 and 54 are operated by pressure signals through lines 55 and 56 respectively. The volume meter feeds a pressure signal through line 57 when it opens oil valve 54. Line 57 connects with the chart recorder 29 and a peak is recorded on the chart thereof for each dump of volume meter 15.

Differential back pressure regulator 58 is interposed in gas line 14 to control the differential between gas line 14 and oil line 16.

Pilot supply gas for operating the system is brought in through line 61 and may be from any convenient source. The pilot supply is preferably in the range of seventy-five to one hundred pounds. A branch line 62 conducts pilot supply gas through a regulator valve 63 preferably set at approximately twenty pounds. Gas from the regulator 63 passes through the high level control indicated generally at 31. The high level control 31, as will be understood by those skilled in the art, is a float type mechanism which permits flow through conduit 62 when the liquid level in separator 20 is below a predetermined height. When the liquid level reaches the predetermined level, the high level control blocks incoming flow through conduit 62 and vents the portion of conduit 62 downstream thereof.

Fluid from conduit 62 passes through a branch conduit 61a to control valve 32 to control flow of pressure fluid to the programmer. Fluid for operating the programmer is delivered through line 61 to conduit 64 and first passes through a regulator valve 65 which reduces the pressure to approximately twenty pounds and then through the control valve 32 to the programmer 12. Of course, the control valve 32 (better shown in FIG. 9) is open when line 61a is pressurized and is closed when line 61a is vented by the high level control 31.

In order to insure proper functioning of separator 20 and volume meter 15, gas pressure from the pilot supply line 61 passes through a branch conduit 66 to a normally open motor valve indicated schematically at 67. When motor valve 67 is open, the pilot supply is conducted through back pressure regulator 68 preferably set at approximately thirty pounds to the gas outlet of separator 20. It is desired to close off flow through line 66 when the system is shut-in by the high level control 31 and for this purpose the line 62 communicates with the motor 67a of motor valve 67 and holds valve 67 open so long as the high level control permits pilot supply to pass through line 62. When the line 62 downstream of the high level control is vented, the control valve 67 automatically closes.

Referring now to FIGS. 3 through 7, there is shown a programmer for use in the system illustrated in FIG. 1. The programmer controls flow of pilot supply gas through lines 45 to the several valves 11 to program production of the field. The programmer has a timing cylinder 71 which controls actuation of a number of drop valves indicated generally at 72. Valves 72 control flow of pressure fluid individually to each of the well control valves 11. When valves 72 are closed, they vent conduits 45 permitting valves 11 to close and shut the wells in. The timing cylinder controls valves 72 through cam actuators indicated generally at 73. The timing cylinder is driven by a pneumatic motor indicated generally at 74. Fluid for driving motor 74 is controlled by the clock mechanism shown in FIGS. 5 and 6. The clock mechanism alternately pressurizes and vents the fluid motor to drive the timing cylinder.

The timing cylinder 71 is a one-piece hollow cylindrical member mounted for rotation on spaced standards 75 and 76. A ball bearing assembly 77 between each of the standards and the cylinder mounts the cylinder for free rotation and O-rings 78 protect the ball bearing assemblies from dust.

Figure 4:
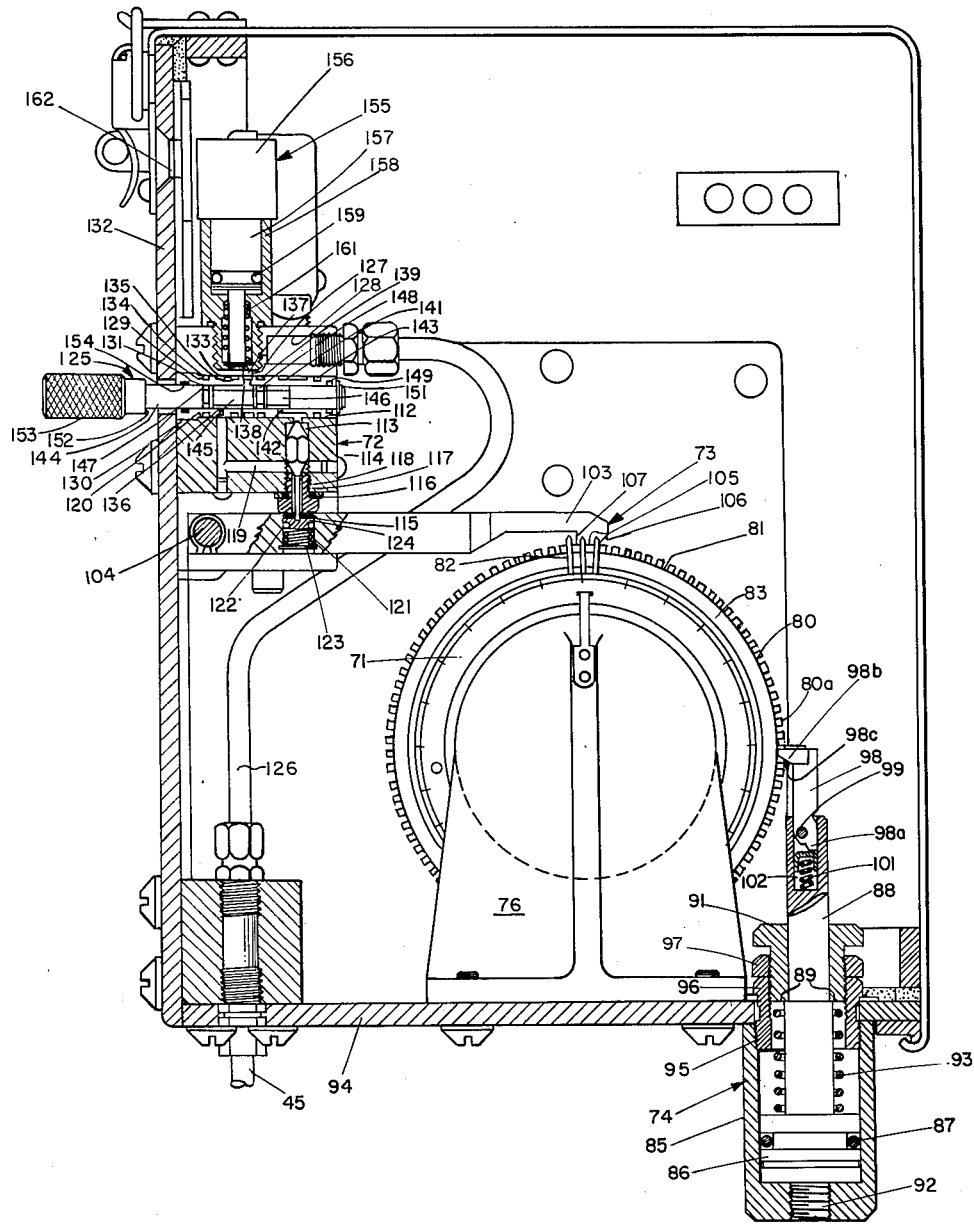
FIG. 4 is a vertical cross-sectional view along the lines 4—4 of FIG. 3.

Spaced axially along the cylinder are a plurality of wheels 80, one 80a for cooperation with the driving motor and one for each well to be controlled by the programmer. These wheels are identical. Each wheel is provided with an annular central groove 79. The periphery of each wheel 80 is provided with spaced notches 81 about its entire circumference as best shown in FIG. 4. These notches are shallower than the annular groove 79. Spring clips 82 are removably positioned in notches 81 and grip undercut portions 83 and 84 on opposite sides of the wheels to retain the spring clips in place. These spring clips are spaced selectively about each wheel and overlie groove 79 to provide a portion of the cam arrangement indicated generally at 73.

The fluid motor 74 is provided by a cylinder 85 having a pressure responsive member such as piston 86 reciprocal therein. A seal may be provided between the piston and cylinder in any desired manner such as by the O-ring 87. The piston 86 is carried by a connecting rod 88 having a shoulder 89 thereon which abuts the bottom of adjusting nut 91 which limits movement of the piston under pressure introduced through inlet 92. The piston is urged in a direction to oppose the force of fluid introduced through inlet 92 by a spring 93 interposed between the piston and nut 91. The cylinder 85 may be secured to the frame 94 of the programmer in any desired manner as by the bushing 95. Bushing 95 has a radially extending flange 96 and the frame is gripped between this flange and the end of cylinder 85. Nut 91 is threadedly secured to bushing 95 to permit the nut 91 to be positioned at selective positions to vary the travel of piston 86. A lock nut 97 holds nut 91 in place after it is adjusted.

The piston 86 drives timing cylinder 71 by a ratchet 98 engageable with grooves 81 in wheel 80a. Ratchet 98 is pivoted to rod 88 at 99 to permit the free end of the ratchet to move away from the timing cylinder. A spring 101 in a bore 102 in the end of rod 88 bears against end 98a of ratchet 98 and urges the free end of the ratchet toward the timing cylinder 71. The ratchet 98 has a laterally extending pawl portion 98b which extends into slots 81. The underside 98c of the pawl portion 98b of the ratchet is inclined so that as the piston 86 moves downwardly, the inclined surface 98c will act as a wedge and cause the ratchet 98 to rotate about its pivot 99 and release the timing wheel 71. With piston 86 in its down position, spring 101 urges the ratchet pawl 98b into a groove 81 and upon pressurizing of cylinder 85 the piston moves upwardly in a direction tangent to the wheel and rotates the wheel a predetermined distance.

The cam mechanism 73 for controlling valve 72 is provided by a weight bar 103 which has one end riding in groove 79. The other end of the weight bar is pivotally mounted about pin 104. The end of the weight bar 103 which engages timing cylinder 71 is provided at its extreme end with a downturned pawl 105. The surface of the pawl which first engages a clip 82 as the wheel rotates is inclined as at 106 to provide a cam surface for raising weight bar 103. The trailing surface 107 of the weight bar may extend perpendicular to the longitudinal dimension of the weight bar. Thus, as the timing cylinder rotates, the weight bar is raised by engagement with a clip 82 and may be held in raised position for a prolonged time by simultaneous engagement with two of the clips if desired. As the last clip 82 moves out from under the weight bar, it drops into slot 79. Raising and lowering of bar 103 operates drop valve 72 as will be explained below.

The valves 72 are all provided in a single manifold like body 108 having a passageway 109 extending therethrough. Control fluid is fed into passageway 109 from conduit 64 through connecting conduit 111. Each valve includes a lateral passageway 112 opening from manifold passageway 109 into a valve chamber 113. The passageway 112 also provides a valve seat. A drop valve 114 is positioned in the chamber 113 for vertical movement therein to open and close the passageway 112. The valve 114 has a tail stem 115 which extends through a central passageway 116 in nut 117 which closes the lower end of the valve chamber 113. The inner end of the nut is beveled to provide a valve seat 118 which cooperates with the lower end of drop valve 114 to seal the flow annulus between nut 117 and valve stem 115. A lateral passageway 119 opens into the side wall of valve chamber 113 and communicates with a line 45 leading to one of motor valves 11 through an overriding mechanism to be explained herein below.

To avoid binding the timing cylinder with the arm 103 a resilient connection is provided between the arm and stem 115 for valve member 114. This resilient connection may be provided by a spring 121 in a bore 122 in arm 103. The spring is compressed between a snap ring 123 and an end plate 124 which is slidable in bore 122. The top of the bore 122 is closed except for a small central bore to retain plate 124 and the stem 115 of the valve member extends through the small central bore and engages plate 124. Thus, the spring 121 resiliently urges valve member 114 upwardly when the drop arm 103 is raised. When the drop arm 103 is lowered, the plate 124 engages the bottom of the bore 122 in arm 103 and falls with the drop arm to permit the valve member to drop into engagement with seat 118.

From the above it is believed that the operation of the valve is apparent. With the drop arm 103 in raised position, the valve member 114 is seated on seat 112 and control fluid is cut off by the valve member. As seat 118 is uncovered, the motor valve 11 is vented through passageway 119 and the annulus between nut 177 and valve stem 115. With the drop arm in down position, inlet seat 112 is open and the vent through nut 117 is closed by valve member 114 seating on seat 118. In this way the motor valve 11 will be respectively opened and closed by pressurizing and venting the underside of the diaphragm 47 through line 45.

The communication between each passageway 119 controlled by the valve 72 and each line 45 leading to one of the motor valves is established through an overriding manual control indicated generally at 125 and an interconnecting line 126. The overriding control closes off the fluid passageway between the manifold line 109 for the control valves and the passageway 119 and operation of valve 72 has no effect on the motor valve 11 normally controlled by valve 72. The overriding control 125 establishes direct fluid communication between the manifold supply line 109 and the line 45. With this control, any or all of the wells controlled by the programmer may be placed on manual control without effecting programming of the other wells.

The overriding control valve 125 is of the push-pull type and when withdrawn to the position shown in the drawings places the well under control of the programmer and when depressed as far as possible places the well on manual control.

The valve body 108 has a cylindrical bore 120 extending therethrough and a counterbore 130 at the front side of the programmer. Bore 120 intersects the manifold passageway 109 and the passageway 119. It also intersects an opening 127 in the body which communicates through a lateral bore 128 with the line 126. A cylindrical sleeve 129 is positioned in the bore. The sleeve at the front of the programmer has a flange 131 which is clamped between the body 108 and the front plate 132 of the programmer to hold the sleeve in place. The sleeve is provided with spaced exterior peripheral grooves and with O-rings for confining fluid in these grooves. These grooves provide a gathering ring for fluid passing through the overriding control. Commencing at the outside or the front wall of the box, a first groove 133 provides a gathering ring for fluid from passageway 119. Groove 133 is confined by O-rings 134 and 135 on opposite sides thereof. A plurality of radial passageways 136 in the cylindrical insert 129 permit passage of fluid from the gathering ring to the interior of the cylindrical insert. The next gathering ring 137 receives fluid from a plurality of lateral passageways 138 in the insert which conduit fluid from the interior of the cylindrical inserts to the gathering ring. This ring is confined by the O-rings 135 and 139. Fluid from this ring passes through passageways 127 into the bore 128 and thence to the line 126. The last groove 141 permits flow through the manifold about the insert and a plurality of radial passageways 142 are provided to admit fluid to the interior of the cylindrical insert when the overriding valve is closed. This groove is positioned between spaced O-rings 139 and 143.

Flow of fluid through the cylindrical insert 129 is controlled by a plunger valve member 144. The valve member has two reduced diameter sections 145 and 146 to provide flow passageways between the valve member and cylindrical insert. Fluid is confined to the desired areas by spaced O-rings 147 at one end of the valve member, 148 intermediate the two reduced diameter portions, and 149 at the other end of the valve member. The valve member is held in the bore through the cylindrical insert by a snap ring 151 on the end of the valve member and is limited in its closing movement by a shoulder 152 on the knurled handle 153 for operating the valve member.

When the well controlled by a particular overriding control 125 is to be operated by the programmer, the overriding control is open and the valve member is in the position indicated in the drawings. In this position flow from the manifold passageway 109 passes to the valve chamber 113 through inlet 112. Flow from passageway 119 passes through gathering ring 133 and the radial passageways 136 into the bore within the cylindrical insert 129. Here it is confined by the spaced O-rings 134 and 139 and passes through the annulus between the insert and reduced diameter portion 145 of the valve member 144 to the radial outlets 138. From the radial outlets fluid passes into the gathering ring 137 and thence into the bore 128 leading to the line 126. When it desired to place the particular well on manual control, the valve member 144 is depressed until the shoulder 152 on the knurled handle strikes the end of the cylindrical insert 129. In this position O-ring 148 passes over the radial passageways 142 leading to the gas inlet manifold passageway 109 and fluid from the manifold passageway may enter the cylindrical insert through the radial passageways 142 and pass over the reduced diameter portion 145 of the valve member and into the outlet radial ports 138 which communicate with line 126. The O-ring 147 will move past the radial inlets 136 from the passageway 119 and block off flow from these ports in one direction. An O-ring 154 in the end of the insert cooperates with the valve member 144 to confine flow from passageway 119 along the valve member in the other direction. Thus, fluid communication is established between the manifold inlet 109 and the line 126 without passing through the valve 72. The valve 72 may continue to be operated by the timing cylinder, but as it in one position closes off the inlet to the valve and in the other position closes off the bleed outlet from the valve, very little control fluid will be lost and operation of valve 72 will have no effect on the well which it normally controls.

It is desirable to be able to inspect the programmer and determine which wells are on production at any time. For this purpose an on and off indicator indicated generally at 155 is provided. The indicator is provided by a block 156 having appropriate indicia thereon which is carried by a piston 157 reciprocal in a cylinder 158. The piston has a sliding seal with the cylinder provided by O-ring 159 and is exposed on its underside to pressure from the gathering ring 137 leading from the overriding control 125. A resilient means such as spring 161 urges the piston downwardly and is effective to move the piston to its down position when the piston is not pressurized by control pressure. Thus, with the control valve 72 blocking flow of control fluid and venting the motor valve for a well, the indicating piston 157 is in its down position and the off indicia is visible through a port 162. When valve 72 is open or when the overriding control 125 is depressed, pressure fluid passing through the programmer raises piston 157 to where the on indicia is visible through the port 162.

The manifold passageway 109 is connected through a line 172 with a three-way valve indicated generally at 171. Valve 171 controls the alternate pressurizing and venting of the fluid motor 74 for operating the timing cylinder. This valve 171 is identical with the drop valve 72. When in its down position, it closes off vent passageway 173 and permits fluid to enter through inlet 174 and to communicate with the motor 74 through a passageway 175. When the valve is in its raised position, it closes off entry of fluid into the motor 74 and vents the motor through the lower passageway 173.

Figure 6:
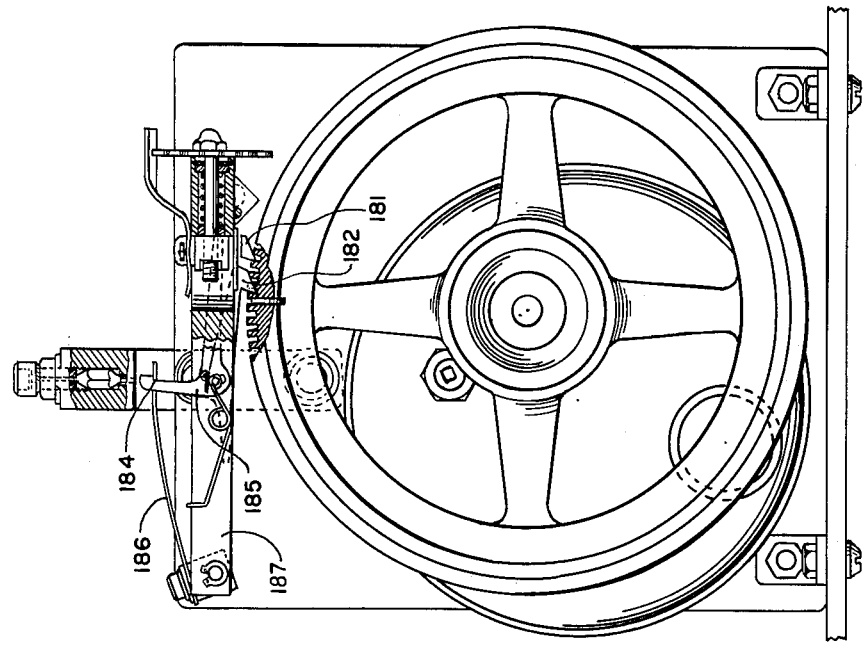
FIG. 6 is a view of the clock of FIG. 5 rotated 90 degrees.
Figure 5:
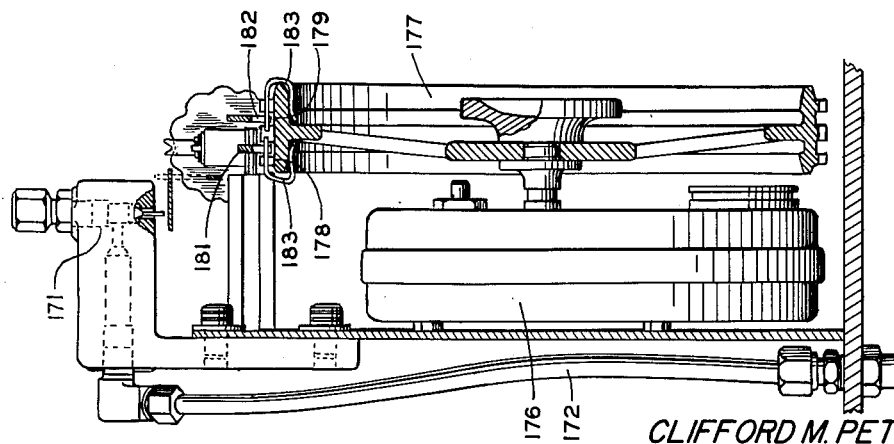
FIG. 5 is a view in side elevation with parts broken away of a clock for controlling the programmer.

Movement of valve 171 between its pressurizing and venting positions is controlled by a suitable timing device so that valve 171 is in pressurizing position for a predetermined period of time, which period starts at a preselected time, and then is moved to venting position where it remains for a predetermined period of time. Such a time control device is shown in FIGS. 5 and 6. The control device of FIGS. 5 and 6 is shown and described in detail in our copending application, Serial No. 537,970, filed October 3, 1955, and reference to our copending application is made for a detailed disclosure of this mechanism. In general, a mechanically wound clock 176 drives a control wheel 177. The control wheel has two annular grooves 178 and 179 in its outer periphery in which cams 181 and 182 ride respectively. The periphery of the wheel is notched to permit pins 183 to be positioned thereon at selected positions. As the control wheel is rotated by the clock, a clip pin 183 extending across the peripheral groove 179 engages cam 182 and rocks it about its pivot. As cam 182 raises, the pawl 184 on the other end of the crank arm 185 which carries cam 182 will disengage and release the leaf spring 186. Spring 186 will force the drop valve 171 upward to close off the source of supply gas and vent the fluid motor 74. After a predetermined time, the cam 182 and the cam 181 on the drop bar 187 will both be engaged by clip pins 183 and the crank arm will be first pivoted, and then the drop bar will be raised to position pawl 184 above the leaf spring 186. The cam 182 will then drop into its groove as it moves over a clip pin 183 and the pawl 184 will move forward into a position to engage leaf spring 186. Then the drop bar 187 will be dropped and the pawl 184 will pull leaf spring 186 down permitting the drop valve to move downwardly under the force of gravity to open the inlet into the threeway valve and close the exhaust port at the bottom of the three-way valve.

In this manner the clock 176 will control pressurizing and venting of the fluid motor 74 and will alternately pressurize and vent the fluid motor at predetermined intervals of time to drive the timing cylinder. As the available fluid pressure may be exerted on a fluid motor of any desired diameter, the required force may be developed in the fluid motor for operating the timing cylinder irregardless of the number of wells which it controls. The size of clock 176 is independent of the number of wells and need develop only sufficient power to operate the drop valve 171. Thus, we have in effect a clock driven programmer for any desired number of wells in which the size of the clock can be maintained within reasonable limits and yet provide exacting time control for operating the programmer.

From the above it will be seen that by selectively arranging the clips 82 on the several timing wheels 80 of timing cylinder 71, flow through the various wells of a field will be controlled. The programmer will maintain each well in the field on flow for a predetermined portion of each month. Flow from each well will be separated into gas, oil and water in separator 20. Gas from the separator will go into the normal gas production gathering system. Oil from the separator will be measured in volume meter 15 and thence flow to the central tank battery for storage.

It will be recalled that when one of the wells of the battery being programmed is to be tested a signal from controller 17 switches the motor valve 11 of a particular well from production to test. This may be a direct signal or it may be set up for indirect control. In the latter case, a fluid motor operated diverter valve (essentially a three-way valve) of any desired design would be placed in the line between the programmer and motor valve 11. The signal from the controller would cause the diverter valve to divert the pressure fluid being applied by the programmer to one side of the diaphragm of the motor valve 11 to the other side of the diaphragm to switch the motor valve 11 from production to test. In the direct control form the pressure signal from the controller is effective directly on the motor valve to shift it from production to test. For instance, the pressure fluid from the programmer may, as in the system illustrated, exert a pressure of approximately twenty pounds per square inch on the diaphragm of a motor valve 11. The controller will send a pressure signal through line 46 of some forty pounds per square inch when the particular well is to be placed on test. This will result in a twenty pound differential shifting the valve 11 to test. After the test cycle is over, line 46 will be vented and the signal from the programmer will provide a twenty pounds signal shifting the valve to production.

The controller preferably utilized in this application to shift the individual wells to test is the controller shown and described in our copending application, Serial No. 537,970. The controller specifically shown in the copending application is modified slightly in the construction of the rotary valve. The modification provides for a double line control of the test system as will appear below.

Figure 10:
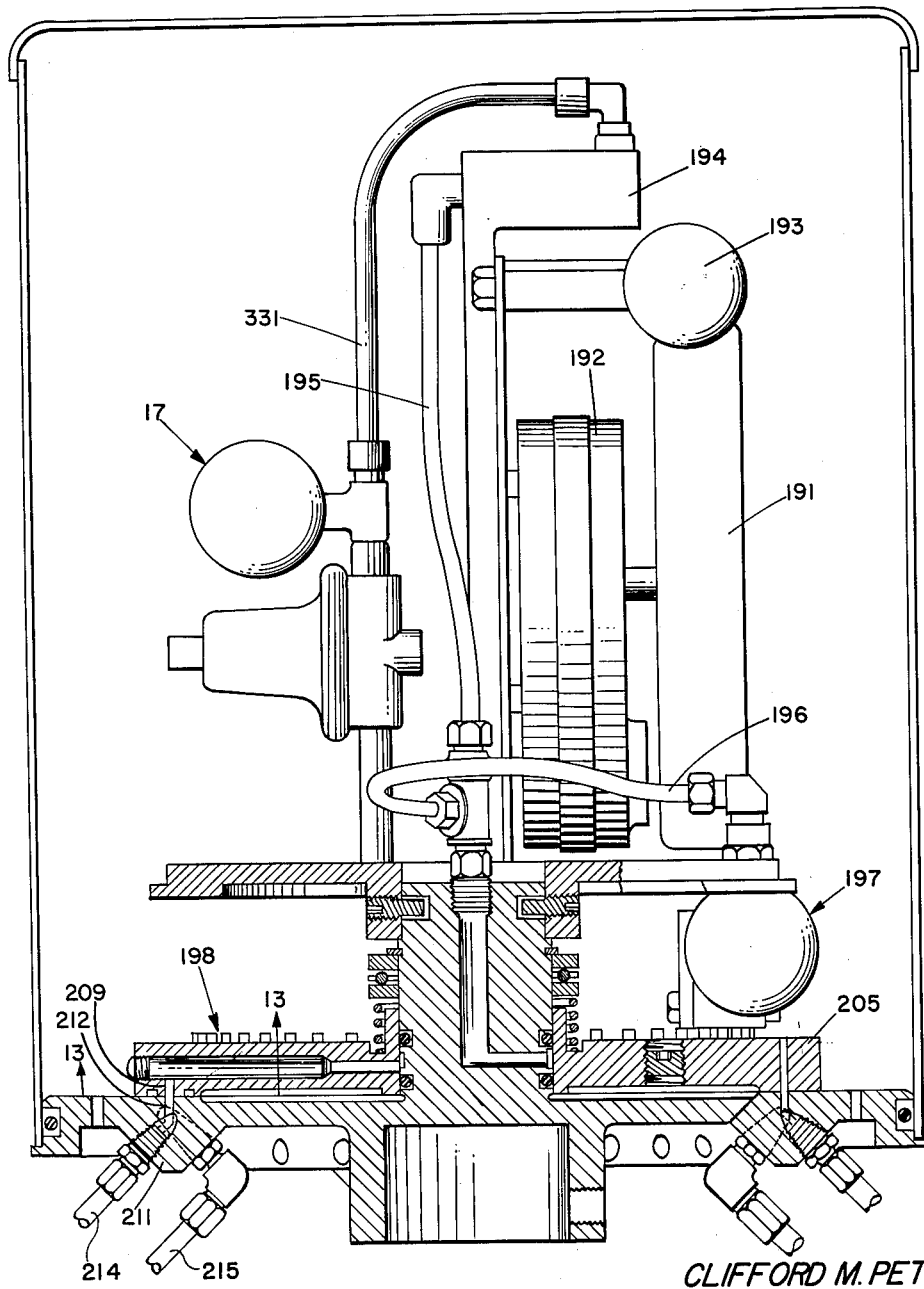
FIG. 10 is a view partially in elevation and partially in vertical cross section through a controller for controlling the test cycle of the system.

The same clock controlled drop valve arrangement shown in our copending application and shown in FIGS. 5 and 6 is shown in FIG. 10. Thus, rotation of wheel 191 by clock 192 operates the drop arm cam mechanism 193 to control the drop valve 194. When valve 194 is positioned to direct pressure fluid to a well motor valve 11, fluid passes through line 195 and branch line 196 to an actuator indicated generally at 197 for the rotary valve indicated generally at 198. The actuator 197 shifts the rotary valve to sequentially test each well in the system and shifts the rotary valve twice for each well on test to provide for a purge period and then a test period.

Figure 11:
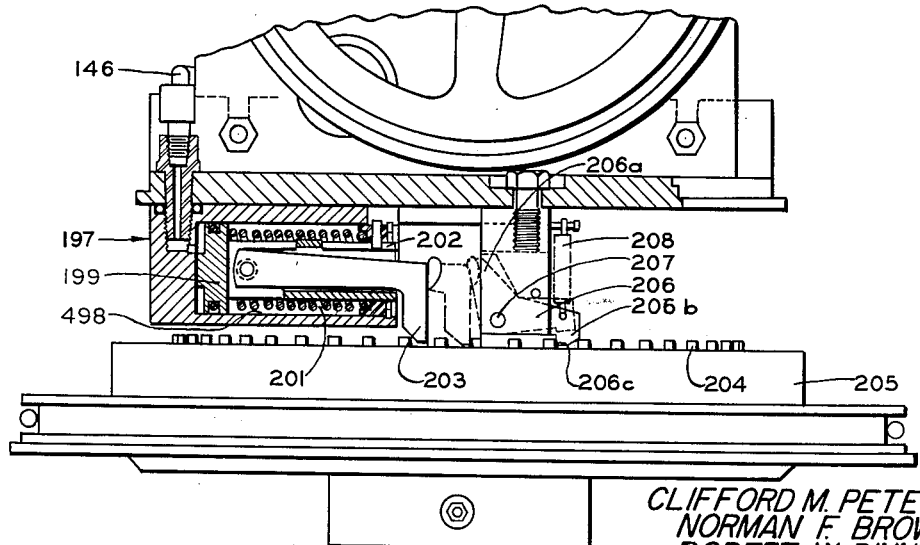
FIG. 11 is a fragmentary view of the controller of FIG. 10 rotated 90 degrees with the controller shown partly in elevation and partly in section.

The actuator 197 is best shown in FIG. 11. Fluid from line 196 passes into a cylinder 498 where it is effective on piston 199 to urge the piston against the resilient spring 201. The piston 199 carries a connecting rod 202 to which there is pivotally secured a ratchet 203. Ratchet 203 engages one of a plurality of upstanding pins 204 in the rotary disk 205 of the rotary valve. Thus, as the piston 199 is reciprocated by first being pressurized and then vented, the ratchet 203 moves the rotary disk 205 of the rotary valve a predetermined distance and then the ratchet 203 is retracted to its original position.

To avoid disk 205 turning more than the desired distance, a latch 206 is mounted on pivot 207 and locks the rotary disk 205 against further movement. As the ratchet 203 of the motor 197 is extended to move the rotary disk 205, the ratchet engages the arm 206a of latch 206. Arm 206a extends away from the valve disk 205 and, therefore, as it is moved about its pivot, the other arm 206b of the latch member is moved downwardly toward the rotary valve. Arm 206b has a pawl 206c which engages one of the upstanding pins 204 in the rotary disk 205 and limits its movement by the motor 197. As the piston 199 of the motor valve is retracted by spring 201, a tension spring 208 raises the pawl 206c out of engagement with the rotary disk 205.

The rotary valve indicated generally at 198 sequentially directs control fluid to piping systems for placing each well on test cycle. Fluid is first directed through a purge line to operate the necessary motors to purge the test system. Control fluid is then directed to the necessary motors to place the well on test. Fluid from line 195 passes through a port 209 in the rotary disk 205 to passageways in the stationary disk 211 of the rotary valve. Disk 211 is provided with a plurality of passageways 212, there being two arcuately spaced passageways 212, connecting to a piping arrangement for purging and testing each well. The passageways 212 are successively placed in communication with the outlet 209 of the rotary valve. Fluid passing through the front passageway 212 for each piping system places the well on purge and when the rotary valve is again kicked, fluid passing through the trailing passageway 212 places the well on test.

Figure 13:
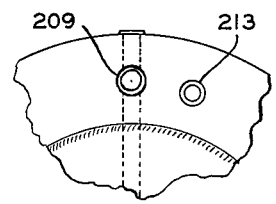
FIG. 13 is a view along the lines 13—13 of FIG. 10.

The rotary valve also cooperates with the piping to provide a block valve for the test signal line while a well is on purge. This structure is provided by an O-ring 213 in the blank face of the rotary disk 205 positioned to surround the trailing passageway 212 in the stationary disk 211 which leads to the test line for a particular well while front passageway 212 for the purge line is receiving fluid from the controller (see FIG. 13). The O-ring 213 is spaced arcuately in front of the outlet 209 in the rotary disk 205 a distance equal to the distance between the passageways 212 for each piping system.

With the rotary valve arranged as described above, the O-ring 213 blocks escape of control fluid through the test pressure line 214 while the controller sends a pneumatic signal through the purge line 215. The pressure signal passes from purge line 215 to four-way fitting 216 and then through check valve 217 to a second four-way fitting 218. From the four-way fitting 218 pressure fluid passes through conduit 46 to one of the motor valves 11 to place the well controlled by this motor valve on test. A signal is also sent from the fitting 218 through line 219 to a particular pen (in the this case pen No. 14) on the recorder 29 which makes a peak on the chart shown in FIG. 18 indicating which well is on the purge and test cycle. The test line 214 is connected to the fourth opening of the four-way fitting and back flow through the line 214 is prevented by the O-ring 213 closing off the trailing port 212 as explained above.

Pressure fluid passes from the first four-way fitting 216 through line 221 to one of a plurality of lights 222 on the test programmer (FIG. 1) to indicate the well which is on purge cycle. These lights are omitted from the programmer shown in FIGS. 3 and 4 to simplify the drawings.

Figure 14:
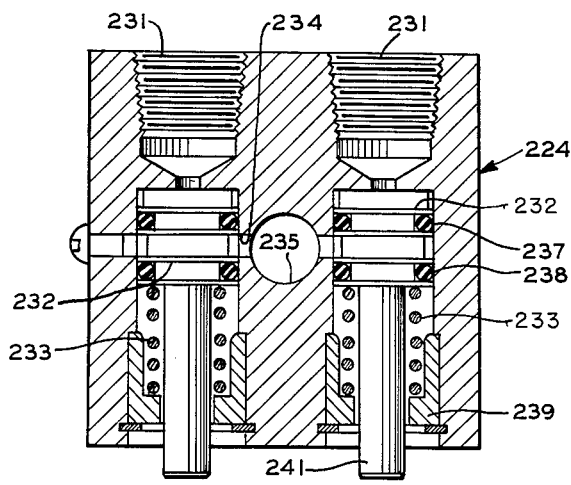
FIG. 14 is a sectional view through the block valve employed in the piping layout shown in FIG. 12.

A pressure signal also passes from the first four-way fitting 216 through line 223 to a block valve 224. This valve is best shown in FIG. 14 and direct flow from the piping system for all of the wells through a conduit 225 to the sampler 24 to operate the rotary valve of the sampler and to direct the test sample to a fresh container, and to operate the shut-in pilot 26 to prevent operation of the sampler valve 27.

Figure 18:
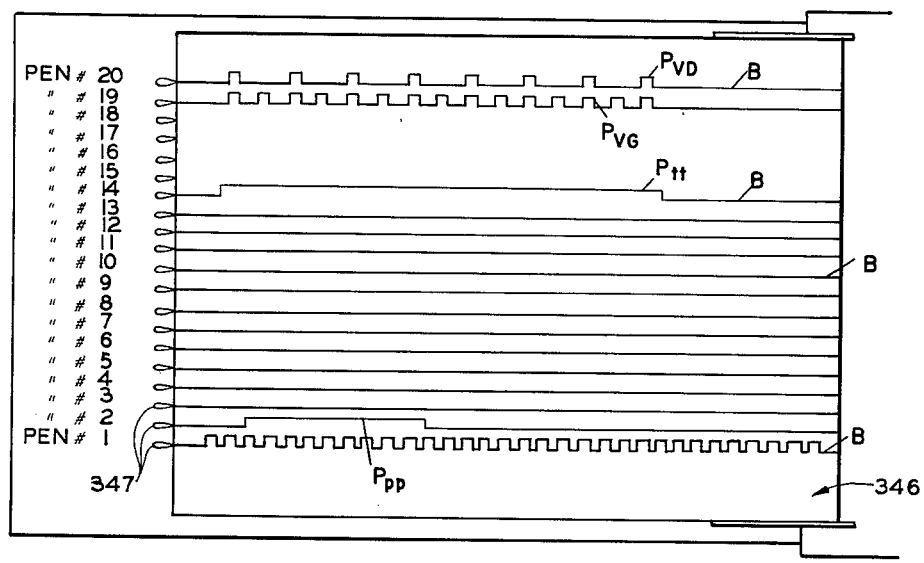
FIG. 18 is a view of a chart made by the chart mechanism of FIGS. 16 and 17.

A signal is also sent from the block valve 224 through line 226 to pen No. 2 of the recorder which makes a peak on the chart shown in FIG. 18 to indicate the time that any well is on purge cycle. This purge pressure is maintained in the piping system for a predetermined length of time sufficient to permit the well being tested to purge the test system. This time interval will depend upon the well being tested and upon the size of the test system.

After the lapse of time necessary to purge the system the controller 17 operates the rotary valve 198. In doing so the controller will first shut off flow of control fluid at the drop valve 194 and vent the motor operator 197 which operates the rotary valve. This permits the piston 199 to retract to the position shown in FIG. 11. Line 215 of the piping system will be vented. This will permit the venting of lines 221 and 223. The former will remove the signal from the light showing which well is on purge. The latter will remove the signal from line 226 which operated pen No. 2 of the recorder. Venting of conduit 223 will also vent the conduit 225 which has been pressurizing the motor operator for the sampler and the shut-in pilot 26. As will appear below, this permits the spring operated fluid motor for the rotary valve of the sampler of retract. Venting of the shut-in pilot 26 permits the pilot to establish communication between a gas line 227 and the sample taker 27. Then as soon as the test volume meter 23 fills, a pressure signal will be sent by the test volume meter through line 227 to operate the sample taker 27 which takes a sample of fluid and delivers it to one of the containers of the sampler.

The test volume meter 23 operates in the manner heretofore explained with reference to the production volume meter 15 to operate oil valves 228 and 229 and measure flow of oil through the test system.

While the purge line 215 is venting, the check valve 217 is maintaining pressure in the four-way fitting 218 so that the well motor valve 11 of the well under test will remain open. To avoid any chance of a small leak in the system or a malfunction of some portion of the piping system which might permit the control fluid in the line 46 leading to the motor valve to reduce in pressure, it is preferred that the controller pressurize line 46 during the test cycle. For this purpose the line 214 is provided and after the purge line 215 has been bled down so that the motor operator 197 for the rotary valve has been vented, the controller is again operated to pressurize the rotary valve motor 197, rotate the disk 205 thereof, and direct the control pressure fluid from line 195 to the line 214. Line 214, of course, pressurizes the four-way fitting 218 and maintains a test pressure through line 46 on the motor operator for a valve 11. After the particular well has been on test a sufficient length of time to obtain a physical sample of oil and to obtain the gas-oil ratio and oil production of the well, the controller again operates the rotary valve 198 to remove the control pressure from line 214. Pressure in the piping system then escapes to atmosphere through the disks of the rotary valve and the well being tested returns to production.

Figure 12:
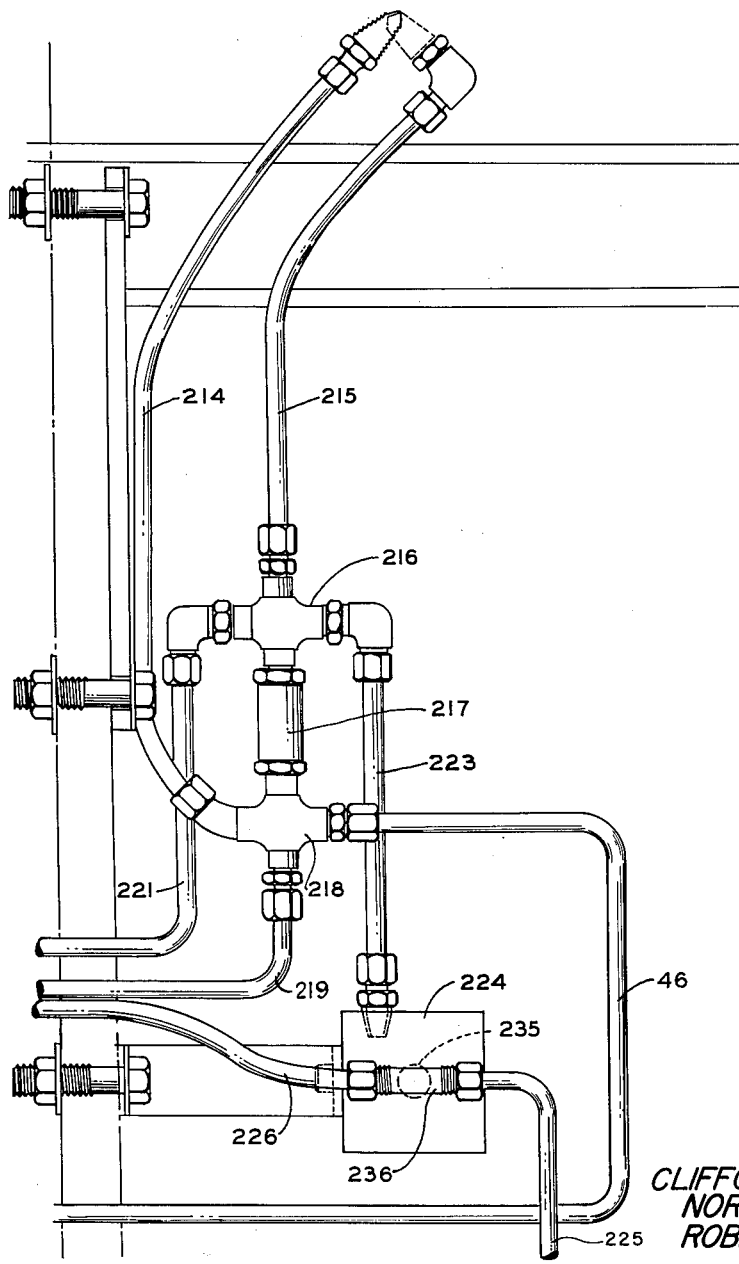
FIG. 12 is a layout view of typical piping for each well of the system.

Referring now to FIG. 14, there is shown a sectional view through the block valve 224 for directing purge fluid to pen No. 2 of the recorder and to the shut-in pilot and rotary sampler. Fluid is delivered to the block valve through any one of a number of inlets 231. An individual inlet is provided for a pipe 223 of each piping system. Pressure in inlet 231 acts on piston 232 to urge it downwardly against spring 233 and establish communication between the inlet 231 and a side port 234. Port 234 leads to a manifold outlet 235 which extends the length of the block valve. The manifold outlet leads to a T-connection. The cross of this T-connection is shown at 236 (FIG. 12) connected to the lines 225 and 226.

Each of the pistons 232 which are not subjected to an endwise pressure through one of the inlets 231 is held by its spring 233 in a position straddling the passageway 234. Piston 232 has spaced annular seals such as O-rings 237 and 238 positioned on opposite sides of the passageway 234 when the piston straddles the passageway 234 to block flow past the piston. The return spring 233 is compressed between piston 232 and a retainer sleeve 239. A guide stem 241 is provided for each piston.

Figure 9:
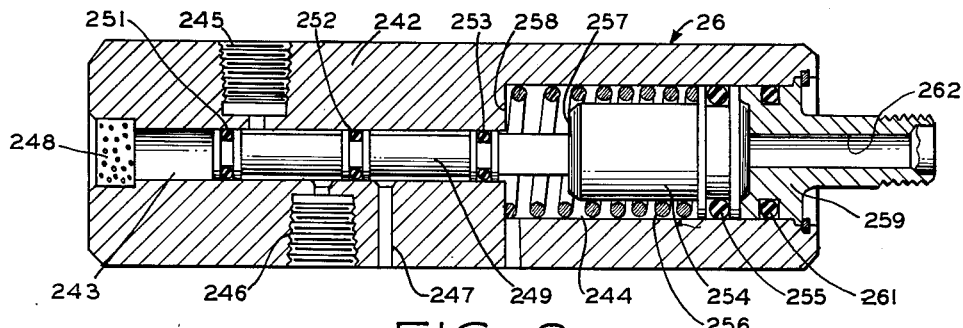
FIG. 9 is a view in longitudinal cross section through a motor pilot valve for controlling the cutoff valve of the sampler of FIG. 8.

Referring now particularly to FIG. 9, there is shown a form of shut-in pilot valve for blocking operation of the sampler while the system is on purge. The valve and motor therefor are housed in a one-piece body 242. The body is bored at 243 to provide a slide valve seat and counterbored at 244 to provide a cylinder for a fluid motor. Lateral inlet passageway 245 conducts fluid to the bore 243 and a lateral outlet passageway 246 spaced along the bore from the inlet provides for flow of fluid from the bore 243. A third lateral passageway 247 spaced along the bore from the inlet and outlet provides an opening for venting the outlet 246 from the valve. The end of the valve seat 243 is closed with a plug 248 to exclude dust.

A reciprocating slide valve member 249 is mounted in the seat bore 243 and when in the position shown permits flow from inlet 245 to outlet 246 through the annulus between the seat and valve member defined by the end O-ring 251 and intermediate O-ring 252. When the valve member 249 is shifted toward plug 248, the intermediate O-ring 252 passes over the outlet 246 and closes off flow between the inlet and outlet. With the valve member 249 positioned with the intermediate O-ring between the inlet and outlet, the outlet 246 is vented through passageway 247 to atmosphere. An end O-ring 253 is provided on the slide valve member 249 to prevent pressure fluid from the outlet 246 reaching the fluid motor for the valve.

The motor for the valve is provided by a piston 254 slidably mounted in the counterbore 244 and having a sliding seal therewith provided by O-ring 255. The piston is urged toward the retracted position illustrated by a spring 256. The piston is integral with the valve member 249. The piston is of larger diameter than the valve member 249 and the shoulder 257 formed by the different diameter portions of the piston and valve member form a stop which cooperates with shoulder 258 between bore 243 and counterbore 244 to limit movement of the piston against the force of spring 256. When these parts are in abutment, seal 252 prevents flow from inlet 245 to outlet 246.

The counterbore is closed by a cap member 259. An O-ring 261 prevents flow of fluid between the cap member and counterbore 244. The cap member is provided with a central passageway 262 to which branch line 225a from line 225 (FIG. 1) is connected. When the fluid motor is pressurized, operating pressure for the sample taker is cut off and the sample taker motor is vented. When the pressure is removed from the fluid motor, the vent is closed and the sample taker is connected to its source of operating pressure.

Figure 15:
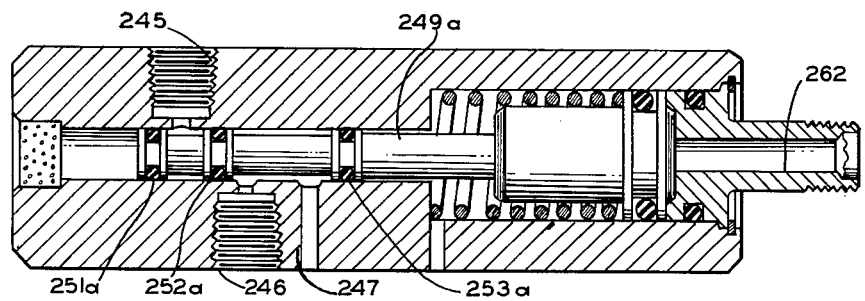
FIG. 15 is a view in longitudinal section through a motor operated valve for controlling flow of pressure fluid to the controller and programmer.

The control valve shown in FIG. 15 provides the control valve 32 and the control valve 33 (FIG. 1) for pilot supply to the programmer and controller. This valve is identical with the valve of FIG. 9 except that the three seals 251a, 252a, and 253a are differently positioned along the valve member 249a. Thus, when the valve motor is not subjected to a pressure through the control inlet 262, the O-ring 252a blocks communication between the inlet 245 and the outlet 246 to prevent pilot supply from reaching the programmer or controller as the case may be. The outlet 246 is vented through the vent 247 so that all control gas will be vented from the test and program system. When pressure is introduced through the conduit 262, the valve member is moved to position O-ring 253a between the vent outlet 247 and outlet 246. The O-ring 252a is moved from between the inlet and outlet to permit flow of pilot supply gas therebetween.

Figure 8:
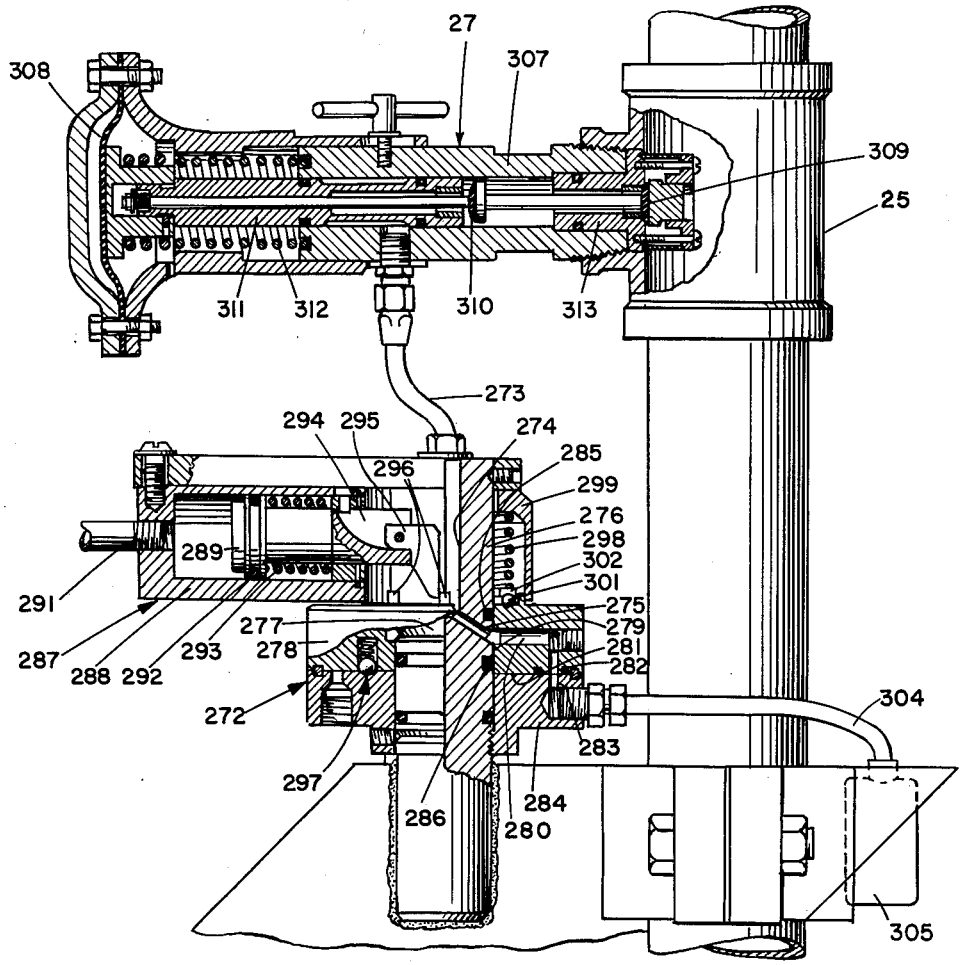
FIG. 8 is a view partly in side elevation and partly in vertical cross section of a sampler for taking test samples.

Referring now to FIG. 8, there is shown a sampler for obtaining samples of oil from each well during the test period. This sampler is generally similar in construction to the sampler shown in our above-identified copending application. The sampler principally differs from the sampler in our copending application in structural detail and in the provision of a sample taking device 27. An oil sample from the sample taker 27 is delivered to a rotary valve indicated generally at 272 through a conduit 273. The oil sample passes through the axial passageway 274 in the rotary valve to a radial passageway 275. These two passageways are provided in an elongate cylindrical member 276. The radial passageway 275 communicates with a circumferential groove 277 in member 276. A disk 278 having a central bore 279 slidably received about the cylindrical member 276 provides a part of the rotary valve 272. The disk 278 has a passageway 280 establishing communication between the annular groove 277 and the underface 281 of the disk 278. The outlet from passageway 280 is surrounded by an O-ring 282 and communicates sequentially with a plurality of outlets 283 in a mating disk 284. Axially spaced O-rings 285 and 286 between the cylindrical member 276 and rotating disk 278 confine flow between the cylindrical member and rotating disk.

The rotary valve is operated by a motor indicated generally at 287. The motor is provided by a cylinder 288 having piston 289 slidably mounted therein. Fluid from line 225b is introduced into the inlet 291 when the test system is first placed on purge cycle by the controller 17. This fluid acts on piston 289 which has a sliding seal 292 with the cylinder wall to urge the piston against the resistance of a compression spring 293. The piston 289 carries a connecting rod 294 to which there is pivotally secured a ratchet 295. The ratchet 295 successively engages pins 296 spaced circumferentially about the disk 278. Thus, as piston 289 is moved against the resistance of spring 293, the ratchet 295 will engage a pin 296 and rotate disk 278 an amount necessary to move the outlet from passageway 280 between adjacent inlets 283 in the stationary disk 284 of the rotary valve. A detent indicated generally at 297 will prevent overtravel of the rotary disk 278. As soon as the purge cycle is over, the pressure against piston 289 is vented from the motor 287 and spring 293 returns the piston 289 to its retracted position.

The two disks of the rotary valve are held in firm abutment by a compression spring 298 compressed between a spring housing 299 and the rotatable disk 278. Roller bearings 301 are interposed between the rotary disk 278 and a spring carrier 302 for the spring 298 to reduce friction.

A sample receiving unit indicated generally at 303 (FIG. 1) comprising a plurality of collecting containers 305 is positioned below the rotary valve and a plurality of conduits 304 lead from passageways 283 in the stationary disk 284 to the several sample collecting containers 305, there being one conduit 304 leading from each passageway 283 to each collecting container 305. Thus, as a sample is taken from the test line, it is passed through the rotary valve through axial passageway 274, radial passageway 275, circumferential groove 277, passageway 280, outlet 283, conduit 304, and thence to one of the containers 305. Then after the particular well test has been completed and a new well is on test, the rotary valve 272 will be rotated by motor 287 to connect the fluid inlet 273 of the rotary valve to another container 305. These containers may be numbered and the rotary valve positioned to correlate with the controller 17 when the system is placed in service so that the identity of the sample contained within a particular jar 305 will be known.

Referring now to the sample taker indicated generally at 27, the device takes a sample from oil test line 25 which is connected to the oil outlet of the test separator. The body 307 is secured in a section of the line 25. The sampler has a diaphragm 308 which is acted upon by pressure from gas line 227 when the shut-in pilot valve is open. It will be recalled that line 227 is pressurized each time the volume meter 23 dumps. When the diaphragm is not pressurized, the sampling valve 309 is closed and, therefore, no sample can be taken.

When pressure is applied to diaphragm 308, the plunger 311 is moved against the force of spring 312. As the plunger moves it first contacts the discharge valve 310 to close this valve. As the plunger continues to move it opens the sample valve 309. Continued movement of the plunger pushes displacement piston 313 into the flow stream through line 25. When pressure is bled off diaphragm 308, sample valve 309 closes on the displacement piston 313 by force of spring 312. Plunger 311 then opens discharge valve 310 and pressure from line 25 forces displacement piston 313 toward the diaphragm to force the sample behind the plunger into the conduit 273 leading to the rotary valve 272.

From the above it is believed that operation of the test system is apparent. Pilot gas from main supply 61 passes through the high level shutoff for separator 20 via conduit 62 and thence to the control valve 33 to maintain the control valve in open position so long as the well system is flowing normally. A conduit 331 branches off from line 64 upstream of the control 32 in line 64 and conducts pressure fluid to the controller 17. Just before the pilot supply reaches the control valve 33, it is reduced to an appropriate pressure, for instance, forty pounds, by a regulator valve 332. The controller operates the test system by first sending a signal through line 215 and line 46 to the motor valve 11 controlling a particular well to open the well to the test manifold 18. A signal is also sent through block valve 224 to line 225 to pressurize the shut-in pilot 26 and to operate the fluid motor 287 of the sampler 24. This prevents operation of the sample taker 27 and positions a fresh container in position to receive a sample.

Fluid from the well on test passes through test line 18 to separator 19 where it is separated into gas, oil and water. Water leaves through line 333 and is dumped into a suitable pit. Outlet of water from the test separator 19 is controlled in any desired manner as by the float valve indicated schematically at 334. Gas leaves the test separator through line 22 and passes through the differential pressure orifice meter indicated generally at 21 to the gas sales line 14. A back pressure valve 336 maintains a desired back pressure between gas line 22 and the oil line 25.

Pilot supply gas is fed from branch line 338 to the gas outlet line 22 of the test separator 19. Branch line 338 receives its gas from line 66. A regulator valve 339 reduces the pilot supply to an appropriate value, for instance, fifty pounds. This pressure insures operation of the test separator and volume meter 23. A check valve 341 is provided in line 338 to prevent reverse flow through this line.

Gas from line 22 passes through a branch control line 342 to the volume meter 23 to provide gas under pressure for operating the meter and the sample taker 27.

Oil leaves the test separator through line 25 and is measured in the volume meter 23. From the volume meter 23 the oil in the test line passes to the oil production line 13 where it mingles with the production from the other wells and goes into the central tank battery.

After the system has been on purge for a predetermined time, the controller 17 shifts and sends a signal through line 214 while venting line 215. This maintains the motor valve of the well under test on the test cycle while venting the line 225 to open the shut-in pilot 26 and to vent the motor 287 of the sampler rotary valve. At this time the sample taker 27 takes a sample of the oil passing through the oil test line 25. After a predetermined time the controller will take the well off test and may be set to immediately put another well on test or to permit some time to elapse before putting another well on test.

All during the purge and test cycle the differential pressure orifice meter 21 measures gas flowing through the test line 22. The meter 21 is operated by a pilot supply from line 340 which receives gas from line 61 through a regular valve 343. Valve 343 is set to deliver an appropriate pressure to the meter 21 such as twenty pounds. Depending upon the volume of flow passing through the orifice of the differential pressure meter 21, a signal is sent through line 344 to the integrator indicated generally at 28. This signal corresponds to the volume of flow per unit of time through the meter 21. The integrator 28 in turn sends a signal to the chart recorder 29 each time a given quantity of fluid, for instance, one thousand cubic feet, passes through the meter 21. This signal causes a peak $Pvg$ to be made by pen No. 19 (FIG. 18) on the chart 346 to indicate that one thousand feet of gas has passed through the test meter 21.

Each time the test volume meter 23 is dumped, a signal is sent through line 345 to the chart mechanism which causes pen No. 20 to make a peak $Pvo$ on the chart. Thus, by producing the well on test over a period of time sufficient to give a representative picture of a well, the number of peaks recorded by pen No. 19 and pen No. 20 may be correlated to determine the gas-oil ratio of the particular well. As explained above, a signal is also sent from the controller 17 to pen No. 2 so that the length of its peak $Ppp$ indicates the length in time of the purge period. The controller also sends a signal to one of the other pens of the recording device such as No. 14 to record a peak $Ptt$ the length of which indicates the time the well was on test and the number of the pen identifying the particular well which produced the oil and gas indicated by pens No. 19 and No. 20. As pen No. 2 indicates the end of the purge period, the oil and gas ratio of the particular well may be determined after the test system has been purged.

Figure 16:
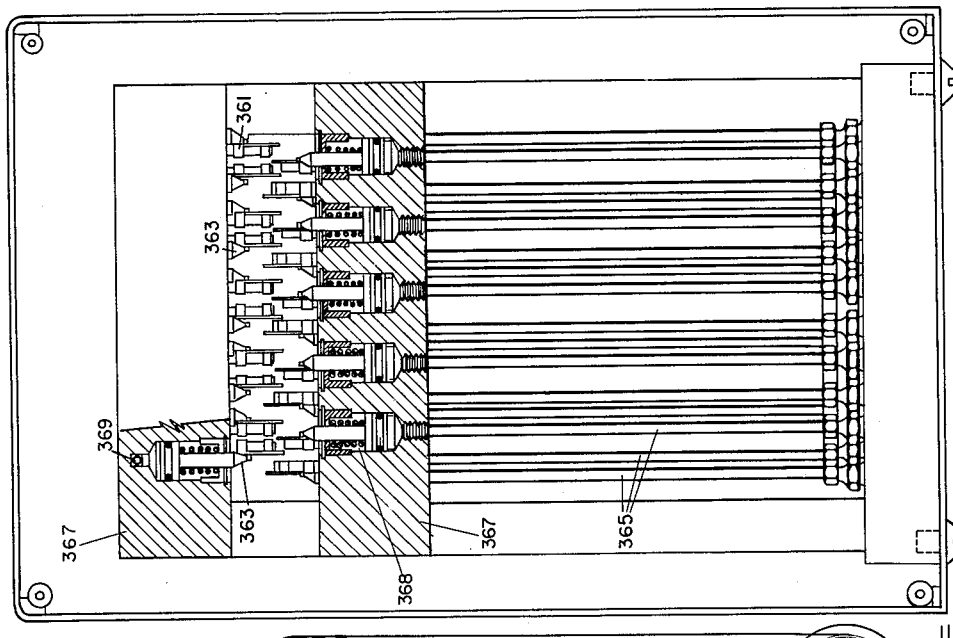
FIG. 16 is a view in vertical cross section through a recorder mechanism.
Figure 17:
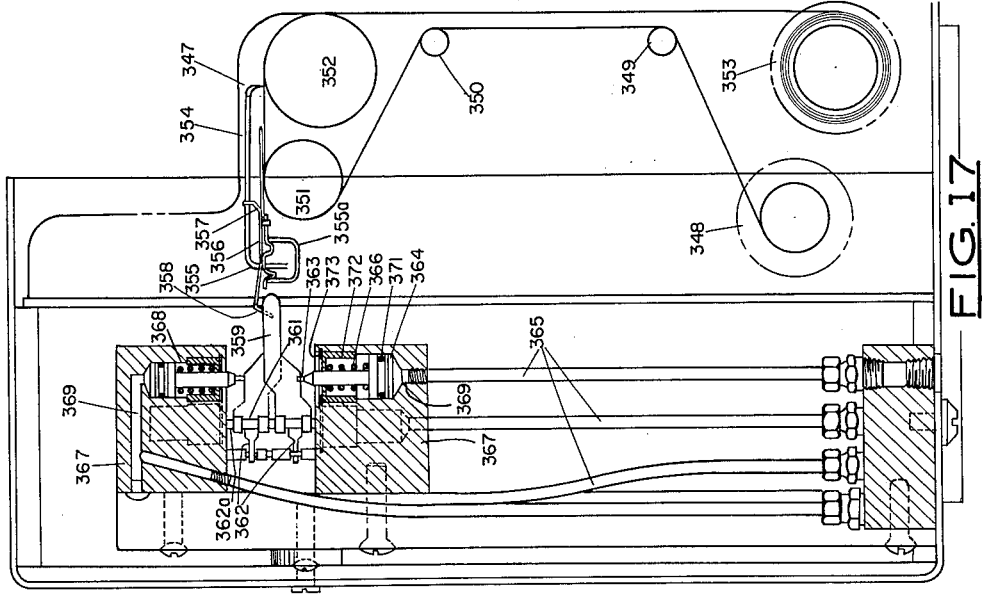
FIG. 17 is a sectional view of the recorder mechanism taken at 90 degrees from the FIG. 16 view.

Referring now to FIGS. 16 and 17, there is shown a recorder for making the chart 346 of FIG. 18. The recorder passes a strip chart under a plurality of pens 347. The chart is supplied from a supply roll 348 and passes successively over idler rolls 349, 350, 351, and 352 and is then wound on roll 353.

The several pens 347 are identical in mounting and function. Each pen is carried by an arm 354 which is pivotally mounted at 355 on a support bracket 355a. An actuator arm 356 is mounted for rotation about pivot 355 (as by passing arm 355 through a hole in arm 356) and has an upstanding fork 357 which engages the pen arm 354 and a downturned fork 358 which is engaged by finger 359. The pen arm 354 is rotated about its pivot with movement of finger 359 about its pivot 361. Finger 359 is urged in one direction by spring 362 into engagement with a cam actuator 363.

The cam actuator 363 is provided by a conical nose on the end of a fluid piston 364 and when the fluid piston 364 is in its retracted position illustrated in the drawings, the pen 347 draws a straight base or reference line B on the chart. When the piston 364 is urged upwardly by fluid pressure from line 365, the cam 363 causes movement of finger 359 about its pivot which in turn causes pen arm 354 to rotate about its pivot to provide a peak on the chart. When the pressure fluid is removed from line 365, a spring 366 returns the piston to its original position and the spring 362 returns the pen 347 to its reference position.

Due to the small area available for piston type motors, half of the piston motors are positioned below the fingers 359 and half are positioned above the fingers 359. Each group of motors is carried in a single block 367 and cylinders for the piston motors are provided by a plurality of closely spaced bores 368. Fluid from the various lines 365 is fed to the cylindrical bore 364 through inlets 369. O-rings 371 provide sliding seals between the pistons 364 and the cylindrical bores 368. The return springs 366 are compressed between the pistons and spring carriers 372 which are held in the open end of bores 368 by snap rings 373.

Referring to the 21st edition (1955-56 edition) of the Composite Catalog of Oil Field and Pipe Line Equipment, a meter suitable for meters 15 and 23 is shown at page 4399, and a liquid level controller for controller 31 is shown at page 3099. Meter 21 can be a simple orifice meter with a differential pressure cell attached to feed a signal to integrator 28 which can be a "Foxboro 14A Integrator" as sold by Foxboro Meter Co. Other known forms of equipment useable for these components are available to the art.

From the above it will be seen that all of the objects of this invention have been attained. There has been provided a programmer operated by fluid pressure alone for controlling a group of wells. There has been provided in cooperation with the pneumatic programmer system a pneumatically controlled test system for determining the gas-oil ratio and the production of each well, as well as obtaining a true uncontaminated sample of the oil produced by each well.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A test system for testing a well comprising, a test line, a first fluid operated motor valve means for a well selectively controlling flow into the test line, a sampler for collecting a sample of well fluid from the test line, second fluid motor operated valve means controlling operation of the sampler, time operated control means, a first conduit extending between the control means and the first valve means, a check valve in the first conduit preventing flow from the motor valve to the control means, a branch conduit extending between the second motor valve and the first conduit on the control means side of the check valve, a second conduit extending between the control means and the first conduit on the outlet side of the check valve, said control means introducing a pressure fluid into the first conduit while blocking flow from the second conduit to pressurize the first and second motor valves and place a well on test and prevent operation of the sampler, said control means venting the first conduit and pressurizing the second conduit after a predetermined time to maintain the signal on the first motor valve means and vent the second motor valve means to maintain said well on test and permit operation of the sampler.

2. The test system of claim 1 wherein the sampler has a plurality of sample receiving containers and the branch conduit supplies a signal to a motor for sequentially positioning the containers in a position to receive a sample, said motor positioning a fresh container in a sample receiving position upon pressurizing of the branch conduit.

3. A control system comprising, motor operated valve means having an inlet and two outlets and operable to prevent flow through the outlets or to direct flow from the inlet to either of the outlets, a time operated programmer connected to the motor operated valve means for selectively sending a signal to the valve motor to open the valve to one outlet, and a time operated controller connected to the motor operated valve means for selectively sending an overriding signal to the valve to shift flow from said one to the other outlet.

4. The control system of claim 3 wherein the time operated programmer is connected to the motor operated valve means by piping adapted to transmit variations of pneumatic pressure.

5. A well control and test system comprising, a motor operated three-way center position closed valve, means for closing the valve when the motor is inoperative, the inlet of said valve secured to a wellhead and the outlets from said valve secured to production and test lines respectively, a time operated programmer for selectively sending a signal to the valve to open the valve to the production line for normal production, and a time operated controller for selectively sending an overriding signal to the valve to shift flow from the production to the test line for a predetermined period of time.

6. A well flowing system comprising, a plurality of fluid producing wells, a main production gathering line, a test line, a plurality of valves equal in number to the number of said wells, each of said valves having its inlet connected to a different one of said wells and one outlet connected to the gathering line and another outlet connected to the test line, said valves providing for no flow or for flow from the well through either of said outlets, a fluid motor for each of said valves operative to close the valve when not subjected to control fluid pressure, a time operated programmer for selectively sending pressure signals to the motors for the valves to open the valves to the production line to program production of each well over selective predetermined periods of time, and a time operated controller for selectively sending overriding pressure signals to the motors to sequentially shift flow of the wells from the production to the test line for a predetermined period of time.

7. A well flowing system comprising, a plurality of fluid producing wells, a main production gathering line, a test line, a plurality of valves equal in number to the number of said wells, each of said valves having its inlet connected to a different one of said wells and one outlet connected to the gathering line and another outlet connected to the test line, said valves providing for no flow or for flow from the well through either of said outlets, a fluid motor for each of said valves operative to close the valve when not subjected to control fluid pressure, a time operated programmer for selectively sending pressure signals to the motors for the valves to open the valves to the production line to program production of each well over selective predetermined periods of time, a sampler for obtaining samples from the test line, and a time operated controller for selectively sending overriding pressure signals to the motors to sequentially shift flow of the wells from the production to the test line for a predetermined period of time and for sending signals to the sampler to place the sampler in operation a predetermined time after each well is placed on test.

8. A well flowing system comprising, a plurality of fluid producing wells, a main production gathering line, a test line, a plurality of valves equal in number to the number of said wells, each of said valves having its inlet connected to a different one of said wells and one outlet connected to the gathering line and another outlet connected to the test line, said valves providing for no flow or for flow from the well through either of said outlets, a fluid motor for each of said valves operative to close the valve when not subjected to control fluid pressure, a time operated programmer for selectively sending pressure signals to the motors for the valves to open the valves to the production line to program production of each well over selective predetermined periods of time, and a time operated controller for selectively rendering the programmer ineffective to hold one of the valves in production position and for shifting said last mentioned valve to test position.

9. A well flowing system comprising, a plurality of fluid producing wells, a main production gathering line, a test line, a plurality of valves equal in number to the number of said wells, each of said valves having its inlet connected to a different one of said wells and one outlet connected to the gathering line and another outlet connected to the test line, said valves providing for no flow or for flow from the well through either of said outlets, a fluid motor for each of said valves operative to close the valve when not subjected to control fluid pressure, a time operated programmer for selectively sending pressure signals to the motors for the valves to open the valves to the production line to program production of each well over selective predetermined periods of time, said programmer having independently adjustable means for each well for determining the time when each well shall be on production and off production, and a time operated controller for selectively sending overriding pressure signals to the motors to sequentially shift flow of the wells from the production to the test line for a predetermined period of time.

10. A test system for a plurality of wells comprising in combination an outlet line from each well connected to a motor valve means for each well; a test line and a production line connected to all of said motor valve means, each of said motor valve means being connected to direct flow from the corresponding well outlet line into the test line when the valve means is in a first position and into the production line when the valve means is in a second position; timer operated means for supplying signals moving each motor valve means to and from said first position one at a time, at predetermined intervals and in predetermined order; means, actuated by a fluid motor, for withdrawing a sample of well fluid, connected to the test line; a line communicating with the test line and with the fluid motor disposed to introduce actuating fluid from the test line and to the motor; a pilot valve, having a vent, disposed in said last mentioned line, said pilot valve having a valve closure member movable between a first position blocking flow from the test line to the fluid motor and venting the fluid motor, and a second position closing the vent and opening the line to fluid flow; and means connected to the timer operated means, for moving the pilot valve to its first position simultaneously with movement of any motor valve means for any well to its first position, and for moving the pilot valve to its second position at a predetermined time after said motor valve means for the well has been moved to its first position.

11. A test system for a plurality of wells comprising in combination an outlet line from each well connected to a motor valve means for each well; a test line and a production line connected to all of said motor valve means, each of said motor valve means being connected to direct flow from the corresponding well outlet line to the test line when the valve means is in a first position and into the production line when the valve means is in a second position; timer operated means for supplying signals moving each motor valve means to and from said first position one at a time, at predetermined intervals, and in predetermined order; means connected to the test line and actuated by a fluid motor, for withdrawing a sample from the test line; a line communicating with the test line and with the fluid motor disposed to introduce actuating fluid from the test line to the fluid motor; a pilot valve, having a vent, disposed in said last mentioned line, said pilot valve having a valve closure member movable between a first position blocking flow from the test line to the fluid motor and venting the fluid motor and a second position closing the vent and opening the line to fluid flow; means, connected to the timer operated means, for moving the pilot valve to its first position simultaneously with movement of any motor valve means for any well to its first position and for moving the pilot valve to its second position at a predetermined time after said motor valve means for the well has been moved to its first position; a pressure operated multiple pen recorder having a pen for each well and a pen for the pilot valve; and means connected to and cooperable with said timer actuated means, for maintaining deflecting pressure on one pen of said recorder while the valve means for that well is in its first position and for maintaining deflecting pressure on the pilot valve pen when the pilot valve is in its second position.

12. A test system for a plurality of wells comprising in combination an outlet line from each well connected to a motor valve means for each well; a test line and a production line connected to all of said motor valve means, each of said motor valve means being connected to direct flow from the corresponding well outlet line into the test line when the valve means is in a first position and into the production line when the valve means is in a second position; timer operated means for supplying signals moving each motor valve means to and from said first position one at a time, at predetermined intervals and in predetermined order; means, connected to the test line and actuated by a fluid motor, for withdrawing a sample from the test line; a line communicating with the test line and with the fluid motor disposed to introduce actuating fluid from the test line into the fluid motor; a pilot valve having a vent, disposed in said last mentioned line, said pilot valve having a valve closure member movable between a first position blocking flow from the test line to the fluid motor and venting the fluid motor and a second position closing the vent and opening the line to fluid flow; a plurality of sample outlet lines; means for diverting a sample to a specific one of said sample outlet lines, including a rotary valve having a central passageway for liquid communicating with said means for withdrawing a sample and with a radial passageway in the rotary valve and a fluid operated motor disposed to rotate the rotary valve through a succession of equal steps, said sample outlet lines being disposed substantially equidistant from each other in the circumference of a circle traversed by the outer end of said radial passageway in rotation; and means, connected to the timer operated means, for moving the pilot valve to its first position simultaneously with movement of a motor valve means for any well to its first position and simultaneously actuating the fluid valve motor or said sample diverting means to advance the rotatry valve one step.

13. A well flowing system comprising a plurality of fluid producing wells; a plurality of three-way valves equal in number to the number of said wells, an outlet line from each well connected to an inlet of a corresponding three-way valve; a test line and a production line connected to outlets from all of said three-way valves, each of said three-way valves being connected to direct flow from the corresponding well outlet line into the test line when the valve is in a first position and into the production line when the valve is in a second position; means responsive to a signal impulse to selectively move each three-way valve to said first position one at a time, at predetermined intervals, and in predetermined order; motor operated means for withdrawing a sample of well fluid connected to the test line; and means, connected to the signal responsive means and timer operated means for supplying a signal impulse to a motor operating the means for withdrawing a sample of well fluid at a predetermined time after each well is connected to the test line.

14. The well flowing system of claim 13 wherein a signal responsive means and the motor operating the means for withdrawing a sample are connected to the timer operated means by piping adapted to transmit variations in pneumatic pressure.

References Cited in the file of this patent

UNITED STATES PATENTS

| | | |
|---|---|---|
| 1,828,126 | Brown | Oct. 20, 1931 |
| 2,125,513 | Martin | Aug. 2, 1938 |
| 2,204,532 | Erbguth et al. | June 11, 1940 |
| 2,311,108 | Hauser | Feb. 16, 1943 |
| 2,478,702 | Moody | Aug. 9, 1949 |
| 2,480,443 | Branson | Aug. 30, 1949 |
| 2,515,658 | Merkel | July 18, 1950 |
| 2,569,432 | Halford | Sept. 25, 1951 |
| 2,674,490 | Richards | Apr. 6, 1954 |
| 2,736,201 | Ohlsen et al. | Feb. 28, 1956 |
| 2,757,067 | Cornell et al. | July 31, 1956 |
| 2,897,836 | Peters et al. | Aug. 4, 1959 |
| 2,940,477 | Brown et al. | June 14, 1960 |